United States Patent Office 2,777,803
Patented Jan. 15, 1957

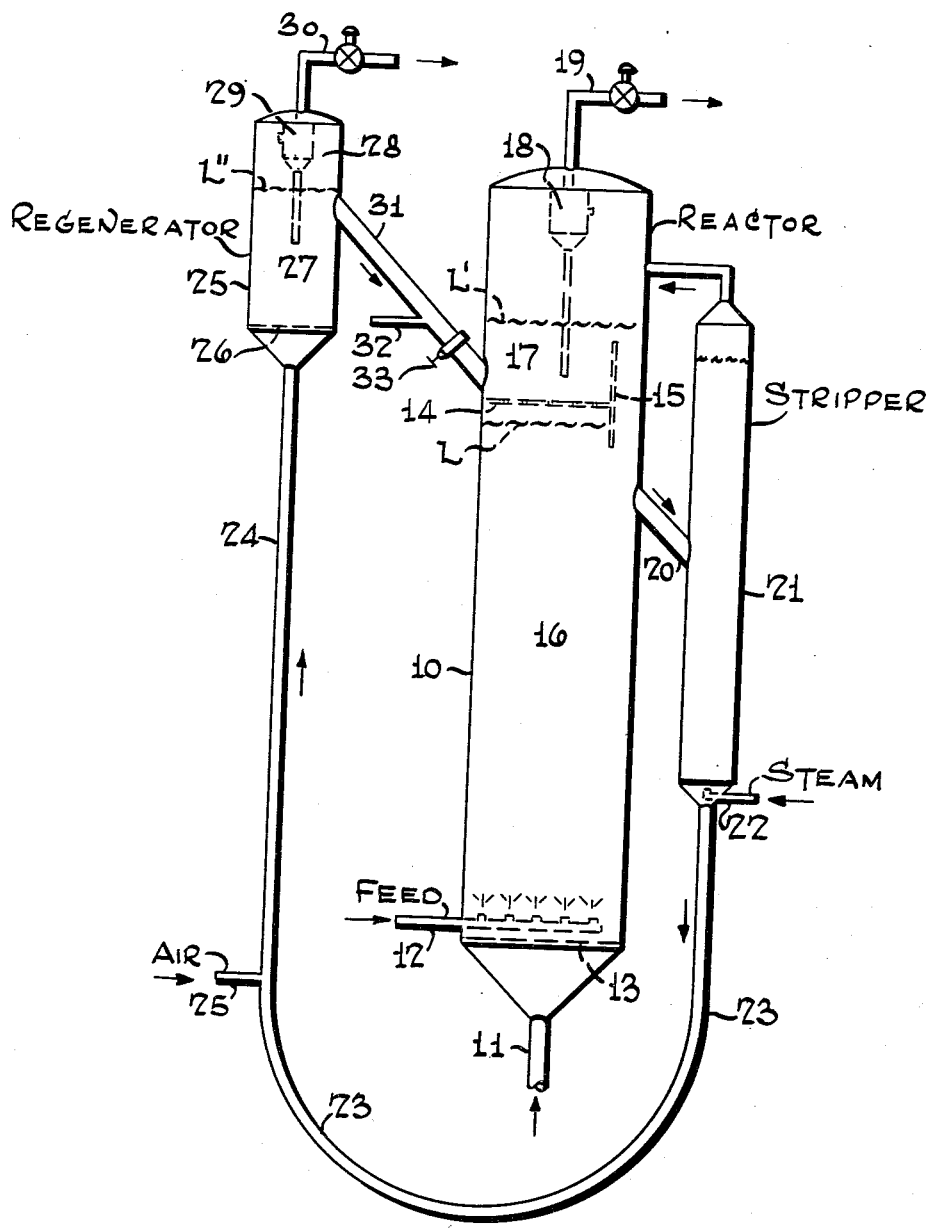

2,777,803

FLUID HYDROFORMING PROCESS WITH INVERSE TEMPERATURE GRADIENT

Robert J. Fritz, Lloyd A. Nicolai, and Edward W. S. Nicholson, Baton Rouge, La., assignors to Esso Research and Engineering Company, a corporation of Delaware Application December 26, 1951, Serial No. 263,443

3 Claims. (Cl. 196—50)

This invention relates to the catalytic conversion of hydrocarbon fractions boiling within the motor fuel boiling range of low knock rating into high octane number motor fuels rich in aromatics and particularly to a process whereby such a conversion is effected by the fluidized solids technique.

Hydroforming is a well known and widely used process for treating hydrocarbon fractions boiling within the motor fuel or naphtha range to upgrade the same or increase the aromaticity and improve the anti-knock characteristics of said hydrocarbon fractions. By hydroforming is ordinarily meant an operation conducted at elevated temperatures and pressures in the presence of solid catalyst particles and hydrogen whereby the hydrocarbon fraction is increased in aromaticity and in which operation there is no net consumption of hydrogen. Hydroforming operations are ordinarily carried out in the presence of hydrogen or a hydrogen-rich recycle gas at temperatures of 750–1150° F. in the pressure range of about 50–1000 lbs. per sq. inch and in contact with such catalysts as molybdenum oxide, chromium oxide or, in general, oxides or sulfides of metals of groups IV, V, VI, VII and VIII of the periodic system of elements, alone, or generally supported on a base or spacing agent such as alumina gel, precipitated alumina or zinc aluminate spinel. A good hydroforming catalyst is one containing about 10 wt. percent molybdenum oxide upon an aluminum oxide base prepared by heat treating a hydrated aluminum oxide or upon zinc aluminate spinel.

It has been proposed in application Serial No. 188,236, filed October 3, 1950, now U. S. Patent No. 2,689,823, to effect the hydroforming of naphtha fractions in a fluidized solids reactor system in which naphtha vapors are passed continuously through a dense fluidized bed of hydroforming catalyst particles in a reaction zone, spent catalyst particles are withdrawn from the dense bed in the reaction zone and passed to a separate regeneration zone where inactivating carbonaceous deposits are removed by combustion whereupon the regenerated catalyst particles are returned to the main reactor vessel or hydroforming reaction zone. Fluid hydroforming as thus conducted as several fundamental advantages over fixed bed hydroforming such as (1) the operations are continuous, (2) the vessels and equipment can be designed for single rather than dual functions, (3) the reactor temperature is substantially constant throughout the bed, and (4) the regeneration or reconditioning of the catalyst may be readily controlled.

A particular advantage of the foregoing fluid solids operation has been the fact that the freshly regenerated catalyst can be utilized to carry part of the heat required for the hydroforming reaction from the regeneration zone into the reaction zone. It has been proposed in this connection to discharge hot, regenerated catalyst particles from the regenerator standpipe into a stream of hot, hydrogen-rich recycle gas in a transfer line whereby the catalyst particles are subjected to a reconditioning treatment involving at least a partial reduction of higher catalytic metal oxides formed during regeneration to a lower or more catalytically active form of catalytic metal oxide during its passage through the transfer line into the reaction zone. In view of the high temperature of the regenerated catalyst (1050–1300° F.) and the exothermic character of the reaction between the hot, freshly regenerated catalyst and the hydrogen it is necessary to make the transfer line small in diameter and very short in order to keep the time of contact of the catalyst and hydrogen-containing gas sufficiently short to avoid overtreatment and/or thermal degradation of the catalyst.

It is the object of this invention to provide a novel method for handling freshly regenerated catalyst whereby it may be contacted with hydrogen-containing gas at temperatures well below regenerator temperature.

It is also the object of this invention to effect contact of freshly regenerated catalyst with hydrogen-containing gas at relatively low temperatures and under conditions which prevent appreciable contact of pretreatment reaction vapors with the main reaction bed.

It is a further object of this invention to provide a novel method for handling freshly regenerated hydroforming catalyst whereby it may be contacted with hydrogen-containing gas at temperatures well below regenerator temperature while establishing an inverse temperature gradient in the reactor vessel.

These and other objects will appear more clearly from the detailed specification and claims which follow.

It has now been found that freshly regenerated hydroforming catalyst can be advantageously treated with hydrogen-containing gas if it is transferred to the upper bed of a duo-bed reactor that is operated with a high rate of entrainment from the lower to the upper bed. In this way the regenerated catalyst is mixed with a large amount of reactor catalyst thereby reducing its temperature sufficiently low to simplify the problem of pretreatment of the catalyst while still effectively transferring heat from the regenerator to the reactor side. Moreover the contact of the hydrogen-containing gas or reaction mixture is under such conditions that water vapor formed in the treatment of the regenerated catalyst with hydrogen-containing gas is rapidly swept away from the dense catalyst bed thereby minimizing the deleterious effects of the water vapor upon catalyst activity and selectivity. In addition this operation permits the maintenance of a higher average temperature level in the upper bed of the reactor thereby achieving an inverse temperature gradient or higher average temperature for the final reaction stage in a two- or multi-stage operation. The latter is especially advantageous since it results in the application of the most drastic reaction conditions to the reaction mixture after the more readily hydroformed constituents have been converted.

Reference is made to the accompanying drawing illustrating a schematic flow plan in accordance with the present invention.

In the drawing 10 is a reactor vessel provided with an inlet line 11 for the introduction of hydrogen-rich or recycle gas or mixtures of vaporized hydrocarbon feed stock and hydrogen-rich or recycle gas. In view of the fact that the recycle gas is heated to much higher temperatures than the feed stock, it is ordinarily preferred to introduce the feed stock separately from the hydrogen-rich gas as through feed inlet line 12. A perforated plate or distribution grid 13 is arranged in the lower part of the reactor vessel to insure uniform distribution of the incoming gas over the entire cross-section of the reactor vessel. At least one horizontal plate 14 is provided in the upper part and the plate is provided with a downcomer 15 which maintains at least a minimum bed of catalyst above the plate 14 and serves to conduct the overflow of fluidized catalyst from above plate 14 into the space therebelow. The reactor is charged with finely divided hydroforming catalyst particles which are maintained as a dense fluidized, turbulent mass 16 in the space above distributor grid 13 having a definite level L. In order to maintain the rate of entrainment of catalyst from dense bed 16 through perforated plate 14 into the dense, fluidized turbulent bed 17 above plate 14 it is necessary to maintain a small outage or free space between the level L and plate 14. Ordinarily under the normal reaction conditions of about 200 lbs. per sq. inch and superficial vapor velocities through the reactor of about 0.2 to 1.0 ft. per second the outage should be less than about 2 feet. As the pressure and/or the superficial velocity of the vapors are increased the outage may be increased. The dense fluidized bed 17 upon plate 14 also has a definite level L'. Sufficient outage or free space should be provided above level L' or between level L' and the inlet to the cyclone separator to prevent overloading of the cyclone separator 18 through which the reaction products are withdrawn from the reactor. Entrained catalyst separated from the product gases in cyclone separator 18 is returned to dense bed 17 through the dip leg attached to the bottom of said cyclone separator. The reaction products are taken overhead through product outlet line 19 and are passed to suitable fractionating, stabilizing and/or storage equipment.

A stream of catalyst is withdrawn continuously from the reactor through catalyst withdrawal line 20 which discharges the spent catalyst into stripper 21 wherein the spent catalyst particles are stripped of entrained or adsorbed hydrocarbons and hydrogen by means of a stripping gas such as steam, nitrogen or the like introduced at 22. Stripping gas and stripped products are taken overhead from stripper 21 and discharged into the dilute phase at the top of the reactor vessel for passage through the cyclone separator 18 in order to recover any catalyst entrained in the stripping gas or if it is desired to have the stripping gases by-pass the reactor completely, a direct connection may be made from the stripper directly into the products outlet line 19.

Stripped spent catalyst is discharged from the base of the stripper into U-bend transfer line 23 into spent catalyst riser line 24. Air, preferably a portion only of that required for regeneration, is supplied at 25 near the bottom of riser 24 in order to reduce the density of the catalyst stream in the upflow leg to the point where the catalyst will flow upwardly into the base of regenerator 25. A perforated plate or distributor grid 26 is arranged near the bottom of regenerator 25 in order to insure uniform distribution of the incoming catalyst and regeneration gas over the entire cross section of the regenerator. The velocity of the regeneration gases is so controlled as to form a dense, fluidized, turbulent bed 27 in the regenerator and having a definite level L" superposed by a dilute phase 28 comprising small amounts of catalyst entrained in the regeneration gases. The regeneration gases are taken overhead through a cyclone separator 29 for separating catalyst particles which are returned to the dense bed 27 through the dip pipe attached to the bottom of separator 29. Regeneration gases are withdrawn through outlet line 30 and passed through a pressure control valve to a waste flue gas stack or to suitable washing and storage equipment if it is desired to use the same as stripping gas. In view of the fact that the oxidative reactions that occur in the regenerator generate more heat than can normally be transferred to the reactor by the circulating catalyst at low catalyst to oil ratios without exceeding safe temperature limits, it is ordinarily necessary to provide cooling coils in the regenerator to prevent the regenerator temperature from exceeding a safe upper limit. A very desirable arrangement is to provide a primary cooling oil entirely below the dense bed level L" and a secondary coil partly below and partly above the dense bed level L" to permit adjustment of the heat exchange capacity by simply varying the dense bed level L" in the regenerator.

Hot, freshly regenerated catalyst is withdrawn directly from the dense bed 27 through regenerated catalyst withdrawal line 31. Stripping gas such as air, nitrogen, flue gas or the like is introduced at 32 near the lower part of line 31 in order to strip the regenerated catalyst of entrained regeneration gases. The flow of regenerated catalyst through line 31 is controlled by slide valve 33 and the catalyst is then discharged into the upper dense bed 17 in the reactor. By maintaining a high rate of entrainment from bed 16 as by maintaining a small outage or free space between the top L of dense bed 16 and the plate 14, sufficient reactor catalyst may be carried from dense bed 16 into bed 17 to effectively control or reduce the temperature of the hot freshly regenerated catalyst from regenerator temperatures of about 1050–1300° F. to below about 950° F. for a reactor temperature of 900° F. The latter temperature is sufficiently low that the treatment of the regenerated catalyst with hydrogen proceeds only so far as to result in an active valence form of the molybdenum, and there is no need for terminating the treatment as quickly as possible inasmuch as no overreduction can occur at these temperature levels. Moreover a temperature about 50° F. above that on the main reactor is advantageous in effecting a conversion of some of the more refractory constituents of the feed stock.

The feed or charging stock to the hydroforming reactor may be a virgin naphtha, a cracked naphtha, a Fischer-Tropsch naphtha or the like. The feed stock is preheated alone or in admixture with recycle gas to reaction temperature or to the maximum temperature possible while avoiding thermal degradation of the feed stock. Ordinarily preheating of the feed stock is carried out to temperatures of about 800–1050° F., preferably about 1000° F. The naphtha preheat should be as high as possible while avoiding thermal degradation thereof as by limiting the time of residence in the furnace and the transfer or feed inlet lines. The preheated feed stock may be supplied to the reaction vessel in admixture with hydrogen-rich recycle gas or it may be introduced separately as shown. The recycle gas, which contains from about 50 to 80 vol. percent hydrogen, is preheated to temperatures of about 1050–1300° F., preferably about 1200° F., prior to the introduction thereof into inlet line 11. The recycle gas should be circulated through the reactor at a rate of from about 1000 to 8000 cu. ft. per barrel of naphtha feed. The amount of recycle gas should be the minimum that will suffice to introduce the necessary heat of reaction and still maintain carbon formation at a low level.

The reactor system is charged with a mass of finely divided hydroforming catalyst particles. Suitable catalysts include group VI metal oxides, such as molybdenum oxide, chromium oxide, or tungsten oxide, or mixtures thereof upon a carrier such as activated alumina, zinc aluminate spinel or the like. Preferred catalysts contain about 5 to 15 wt. percent molybdenum oxide or from about 10 to 40 wt. percent chromium oxide upon a suitable carrier. If desired, minor amounts of stabilizers and promoters such as silica, calcium oxide, ceria or potassia can be included in the catalyst. The catalyst particles are, for the most part, between 100 and 400 mesh in size or about 0–200 microns in diameter with a major proportion between 20 and 80 microns.

The hydroforming reactor vessel should be operated at temperatures between about 850 and 950° F., preferably at about 875–900° F. in the first reaction zone or lower bed 16 and at about 900–950° F. in the final reaction zone or upper bed 17. The pressure in the reactor system should be between 50 and 500 lbs. per sq. inch, preferably about 200 lbs. per sq. inch. Temperatures above 900° F. result in increased carbon formation and lower selectivity to gasoline fractions while at temperatures below about 900° F. operating severity is low and would therefore require an excessively large reaction vessel. Ordinarily, lowering reactor pressure below 200 lbs. per sq. inch results in increased carbon formation which becomes excessive in most cases below about 75 lbs. per sq. inch. Above 200 lbs., however, catalyst selectivity to light products (C₄'s and lighter) increases rapidly. The regenerator is operated at essentially the same pressure as the reactor and at temperatures of about 1050–1300° F., preferably about 1200° F. The residence time of the catalyst in the reactor is of the order of from about 3 to 4 hours, while the residence time of the catalyst in the regenerator is of the order of about 3 to 15 minutes.

The weight ratio of catalyst to oil introduced into the reactor should be about 0.5 to 1.5. It is preferred to operate at catalyst to oil ratios of about 1, since ratios above about 1 to 1.5 result in excessive carbon formation. Somewhat higher weight ratios can be used at higher pressures.

Space velocity or the weight of feed in pounds charged per hour per pound of catalyst in the reactor depends upon the age or activity level of the catalyst, the character of the feed stock and the desired octane number of the product. Space velocity for a molybdenum oxide or aluminum gel catalyst may vary, for example, from about 1.5 wt./hr./wt. to about 0.15 wt./hr./wt.

For a typical case, operating conditions and temperatures are given below for operation on a light virgin naphtha of 57° API gravity.

| | |
|---|---|
| Feed rate | 20,000 B./D. |
| C/O ratio | 1.0 |
| Recycle rate | 5,000 C. F./B |
| Severity | 0.25 wt./hr./wt. |
| Regenerator temperature | 1200° F. |
| Pretreat and cleanup section of reactor | 925° F. |
| Main body of reactor | 875° F. |
| Catalyst circulation rate | 218,000 lbs./hr. |
| Catalyst circulation to pretreat section for cooling | 1,420,000 lbs./hr. |
| Total gas leaving reactor | 1,000,000 C. F. H. (at 875° F. and 200 p. s. i. g.). |
| Required entrainment to pretreat section to cool incoming regenerator catalyst | 1.42 lbs./C. F. |

Entrainments at 200 p. s. i. g. at reactor conditions of 1.4 lbs./C. F. can be obtained at about 1 ft. outage. With a 40 lbs./cu. ft. catalyst density, the 1 ft. outage can be obtained by designing the grid below the pretreat section for approximately 8 inches of H₂O pressure drop. It will be noted that for the base conditions, a 4 hour reactor holding time is obtained. It is desired to have the hold-up in the pretreat section ⅛ to ¼ of the total reactor hold-up. Since the initial phases of the reduction take place quickly, only a very small portion of the catalyst in the pretreating section is unreduced at any time.

The foregoing description contains a limited number of embodiments of the present invention. It will be understood, however, that numerous variations are possible without departing from the scope of the following claims.

What is claimed is:

1. In a process for hydroforming hydrocarbons in contact with finely divided hydroforming catalyst particles consisting essentially of a Group VI metal oxide dispersed upon a carrier in accordance with the fluidized solids technique at temperatures of from about 850°–950° F., pressures of from about 50 to 500 pounds per square inch, and at catalyst to oil weight ratios of from about 0.5–1 to about 1.5–1 the improvement which comprises maintaining two dense, fluidized beds of hydroforming catalyst in vertically spaced relation to each other in a reaction zone maintaining the upper dense fluidized bed at a substantially higher temperature than the lower dense fluidized bed, passing hydrocarbon feed vapors preheated to about 800–1050° F. and hydrogen-rich gas preheated to 1050–1300° F. upwardly through said beds in series, the amount of hydrogen-rich gas being about 1,000 to about 8,000 cubic feet per barrel of liquid feed continuously withdrawing a stream of spent catalyst particles from the lower dense bed in the reaction zone, regenerating the withdrawn spent catalyst particles by burning carbonaceous deposits therefrom at temperatures of about 1050–1300° F., recycling hot regenerated catalyst particles to the upper dense fluidized bed in the reaction zone, maintaining a high rate of entrainment of catalyst particles from the lower dense bed to the upper dense bed in the reaction zone in order to control the temperature of the freshly regenerated catalyst in contact with the hydrogen-containing reaction mixture in said upper dense bed.

2. In a process for hydroforming hydrocarbons in contact with finely divided hydroforming catalyst particles consisting essentially of a Group VI metal oxide dispersed upon a carrier in accordance with the fluidized solids technique at temperatures of from about 850°–950° F., pressures of from about 50 to 500 pounds per square inch, and at catalyst to oil weight ratios of from about 0.5–1 to about 1.5–1 the improvement which comprises maintaining two dense, fluidized beds of hydroforming catalyst in vertically spaced relation to each other in a reaction zone, maintaining the lower dense bed at a temperature of 875–900° F. and the upper dense bed at 900–950° F., passing hydrocarbon feed vapors preheated to about 800–1050° F. and hydrogen-rich gas preheated to 1050–1300° F. upwardly through said beds in series, the amount of hydrogen-rich gas being about 1,000 to about 8,000 cubic feet per barrel of liquid feed continuously withdrawing a stream of spent catalyst particles from the lower dense bed in the reaction zone, regenerating the withdrawn spent catalyst particles by burning carbonaceous deposits therefrom at temperatures of about 1050–1300° F., recycling hot regenerated catalyst particles to the upper dense fluidized bed in the reaction zone, maintaining a high rate of entrainment of catalyst particles from the lower dense bed to the upper dense bed in the reaction zone in order to control the temperature of the freshly regenerated catalyst in contact with the hydrogen-containing reaction mixture in said upper dense bed.

3. In a process for hydroforming hydrocarbons in contact with finely divided hydroforming catalyst particles consisting essentially of a Group VI metal oxide dispersed upon a carrier in accordance with the fluidized solids technique at temperatures of from about 850°–950° F., pressures of from about 50 to 500 pounds per square inch, and at catalyst to oil weight ratios of from about 0.5–1 to about 1.5–1 the improvement with comprises maintaining two dense, fluidized beds of hydroforming catalyst in vertically spaced relation to each other in a reaction zone, maintaining the lower dense bed at a temperature of 875–900° F. and the upper dense bed at 900–950° F., passing hydrocarbon feed vapors preheated to about 800–1050° F. and hydrogen-rich gas preheated to 1050–1300° F. upwardly through said beds in series, the amount of hydrogen-rich gas being about 1,000 to about 8,000 cubic feet per barrel of liquid feed continuously withdrawing a stream of spent catalyst particles from the lower dense bed in the reaction zone, regenerating the withdrawn spent catalyst particles by burning carbonaceous deposits therefrom at temperatures of about 1050–1300° F., recycling hot regenerated catalyst particles to the upper dense fluidized bed in the reaction zone, maintaining a high rate of entrainment of catalyst particles from the lower dense bed to the upper dense bed in the reaction zone in order to control the temperature of the freshly regenerated catalyst in contact with the hydrogen-containing reaction mixture in said upper dense bed to below 950° F.

References Cited in the file of this patent

UNITED STATES PATENTS

| | | |
|---|---|---|
| 2,410,891 | Meinert et al. | Nov. 12, 1946 |
| 2,471,034 | Hall et al. | May 24, 1949 |
| 2,483,485 | Barr | Oct. 4, 1949 |
| 2,585,238 | Gerhold | Feb. 12, 1952 |